United States Patent [19]
Chiang

[11] Patent Number: 5,617,999
[45] Date of Patent: Apr. 8, 1997

[54] CONNECTOR MEMBER ASSEMBLY FOR USE WITH SPRINKLER SYSTEM

[76] Inventor: Jung-Li Chiang, 930 W. Maude Ave., Sunnyvale, Calif. 94086

[21] Appl. No.: 372,355

[22] Filed: Jan. 13, 1995

[51] Int. Cl.⁶ .............................. B05B 1/14; B05B 1/32
[52] U.S. Cl. .......................... 239/268; 239/548; 239/539; 239/579
[58] Field of Search ................. 239/207, 266–268, 239/276, 285, 562, 456–458, 537–542, 548, 579, 581.2, 39, 391, 561; 285/248, 249, 322, 323

[56] References Cited

U.S. PATENT DOCUMENTS

| | | | |
|---|---|---|---|
| Re. 29,022 | 11/1976 | Spencer | 239/542 |
| 2,605,143 | 7/1952 | Bishop | 239/539 |
| 2,680,653 | 6/1954 | Bishop | 239/539 |
| 3,006,558 | 10/1961 | Jacobs | 239/267 |
| 3,767,124 | 10/1973 | Spencer | 239/542 |
| 3,810,582 | 5/1974 | Lodge | 239/542 |
| 4,226,368 | 10/1980 | Hunter | 239/542 |
| 4,585,255 | 4/1986 | Ridenour | 285/322 X |
| 5,056,831 | 10/1991 | Ho | 285/156 X |
| 5,431,456 | 7/1995 | Okumura et al. | 285/156 |

FOREIGN PATENT DOCUMENTS 16894 of 1901 United Kingdom .................. 239/267

*Primary Examiner*—Lesley D. Morris

[57] ABSTRACT

A connector member (10) for use with a sprinkler system includes a hollow body (12) having a passage (14) therein, and at least two open end portions (16) for communication with the exterior. Each open end portion (16) includes an inner tubular section (18) in communication with the passage (14) of the body (12), and an outer tubular section (20) in a concentric relation with the inner tubular sections (18). The outer tubular section (20) includes external threads (23) on its surface around the central axis, and several slits (21) extending from the edge axially. The connector member (10) further includes two types of covers (26, 28) for respective cooperation with the open end portions (16) wherein one type is a fastening device (26) to firmly attach the pipe onto one open and portion (16) of the connector member (10), and the other type is a irrigation device (28) installed onto the other open end portion (16) for adjustable spraying water on the ground around such connector member (10).

5 Claims, 5 Drawing Sheets

CONNECTOR MEMBER ASSEMBLY FOR USE WITH SPRINKLER SYSTEM

BACKGROUND OF THE INVENTION

1. Field of the Invention

The invention relates to a series of connector members for use with a sprinkler system, particularly to each connector member which can function both as connection mechanism for connecting the adjacent pipes and as a sprinkler or a dripper for irrigation around such connector member.

2. The Prior Art

Most existing connector members for use with a sprinkler irrigation system are only for connection between two adjacent pipes wherein independent sprinklers are required to be attached to such connector members, respectively. As well known, such conventional connector members may be of three-way tubing tees and two-way (straight) tubing couplings or (right angle) tubing elbows wherein the connection between the connector member and the corresponding pipe is generally of adhesion or snap-in attachment.

Accordingly, an objection of the invention is to provide a connector member for use with a sprinkler system, which functions as not only a connection mechanism between two adjacent pipes, but also a sprinkler or dripper member for irrigation around such connector member.

Another objection of the invention is to provide a connector member for use with a sprinkler system which has a flexible mechanism to reinforce the fastening with the corresponding pipe.

Another objection of the invention is to provide a connector member for use with a sprinkler system which can further function as a regulator for controlling the flow rate of the sprinkled water thereabout. Therefore, it is feasible to arrange the equal flow rate of the sprinkled water along the pipe line of such sprinkler system. It can be understood that without proper regulators it may have less sprinkled water at the end of such sprinkling system if the pipe line is too long or the pressure of water source is not enough.

SUMMARY OF THE INVENTION

According to an aspect of the invention, each of the connector members for use with a sprinkler system includes a hollow body having a passage therein, and at least two open end portions for communication with the exterior. Each open end portion includes an inner tubular section in communication with the passage of the body, and an outer tubular section in a concentric relation with the inner tubular section. The outer tubular section includes external threads on its surface ground the central axis and several slits extending from the edge along such central axis. The connector member further includes two types of covers for cooperation with the open end portions wherein one type is a fastening device to firmly attach the pipe onto one open end portion of the connector member, and the other type is an irrigation device installed onto another open end portion for adjustably spraying water on the ground around such connector member.

DETAILED DESCRIPTION OF THE PREFERRED EMBODIMENT

References will now be made in detail to the preferred embodiments of the invention. While the present invention has been described with reference to the specific embodiments, the description is illustrative of the invention and is not to be construed as limiting the invention. Various modifications to the present invention can be made to the preferred embodiments by those skilled in the art without departing from the true spirit and scope of the invention as defined by appended claims.

Figure 1:
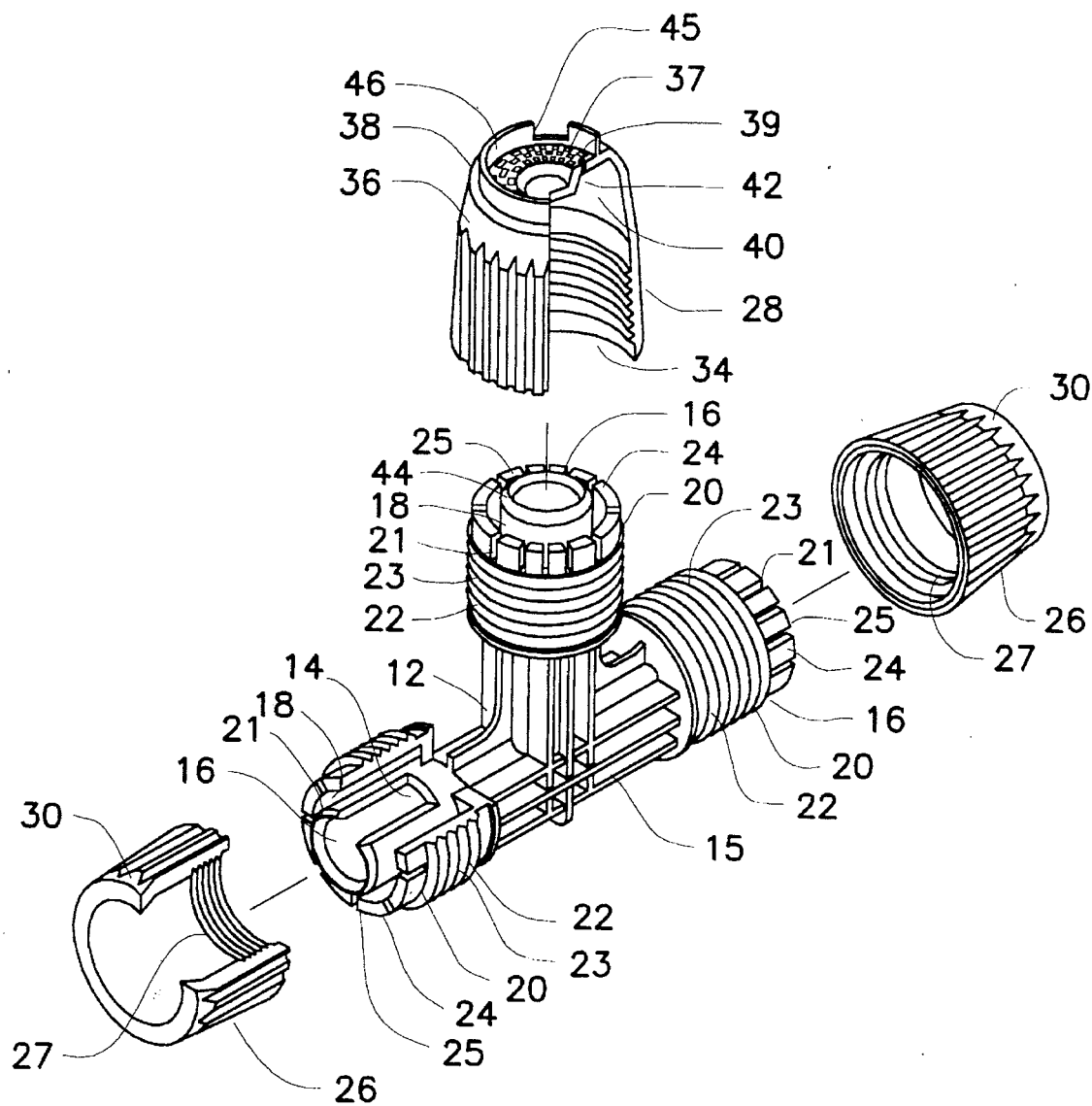
FIG. 1 is an exploded and partially cut-away perspective view of a presently preferred embodiment of a connector member according to the invention.

It will be noted here that for a better understanding, most of like components are designated by like reference numerals throughout the various figures in the embodiments. Attention is now directed to FIG. 1 wherein a connector member 10 is generally of a tee structure having a T-shaped hollow body 12 including a passage 14 therein and a plurality of reinforcement ribs 15 thereon. An open end portion 16 is positioned at each of the three ends of such body 12. Each open end portion 16 includes an inner tubular section 18 in communication with the passage 14, and an outer tubular section 20 concentrically surrounding such inner tubular section 18. The outer tubular section 20 comprises a thread portion 22 having external threads 23 provided on the surface thereof, and a flexible portion 24 having a plurality of slits 21 extending axially from the edge 25 to the thread portion 22.

A fastening cover or a clamping socket 26 is adapted to be attached to each of two opposite side end portions 16 of the connector member 10, and an irrigation cover or a nozzle 28 is adapted to be attached to the top end portion 16 of the connector member 10. Each clamping socket 26 is of a tubular type having internal threads 27 provided on the inner surface. A slope portion 30 is provided at the outer end Of the clamping socket 26 whereby a smaller opening 32 is formed thereof.

similar to the clamping socket 26, the nozzle 28 also is provided with internal threads 34 on its inner surface and with a slope portion 36 at the outer end. While different from the clamping socket 26, a dispersal dish section 38 is integrally formed in the slope portion 30. A bowl-like section 40 is positioned at the center of such dish section 38, and has a circumferential wall 42 defining a slope in compliance with the chamfer 44 formed on the edge of the inner tubular section 18 of the connector member 10. A plurality of holes 39 are disposed in the ring region 37 of the dish Section 38 wherein ring region 37 surrounds the bowl-like section 40. A ring type restraint flange 46 vertically extends from the periphery of the dish section 38.

Figure 2:
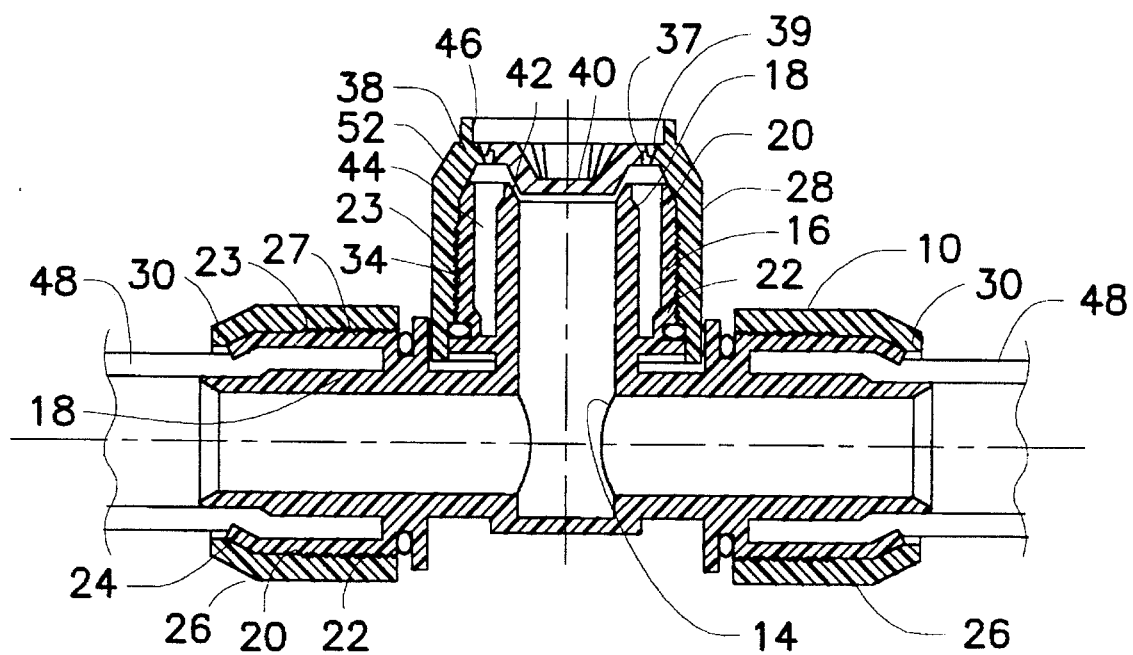
FIG. 2 is a cross-sectional view of the connector member of FIG. 1 to show two sides pipes and the top nozzle attached thereto.

Referring to FIG. 2, when assembled, one end of a pipe or the hose 48 can be inserted into the space between the inner tubular section 18 and the outer tubular section 20 in the connector member 10. Successively, the clamping Socket 26 is fastened to the either side open end portion 16 with the internal threads 27 of the clamping socket 26 engaging the external threads 23 of the thread portion 22 of the outer tubular section 20 of the connector member 10 whereby the slope portion 30 of the clamping socket 26 presses the edge of the flexible portion 24 inwardly, thus firmly clamping the corresponding pipe 48 against the inner tubular section 18. Accordingly, the pipe 48 can be attached to the connector member 10 securely.

Differently, the nozzle 28 is fastened to the top side open end portion 16 with the internal threads 34 engaging the outer threads 23 of the thread portion 22 of the outer tubular section 20 of the connector member 10. It can be seen that the ring-like tube type space 50 formed between the outer tubular section 20 and the inner tubular section 18 is substantially aligned with the ring region 37 of the dish section 38 of the nozzle 28 where has a plurality of holes 39 therein for jetting. The clearance 52 between the circumferential wall 42 of the bowl-like section 40 of the nozzle 28 and the chamfered edge 44 of the inner tubular section 18 of the connector member 10 allows the water in the passage 14 to pass through and enter the space 50 and successively to spread out on the ground via the holes 39 of the nozzle 28. It can be understood that the flow rate or the water pressure of the jet results from the dimension of the clearance 52 which is derived from the relatively axial positions of the nozzle 28 and the open end portion 16 of the connector member 10. When the nozzle 28 is moved to the lowest position with regard to the open end portion 16 of the connector member 10, the circumferential wall 42 of the bowl-like section 40 of the nozzle 28 abuts against the chamfer 44 of the inner tubular section 18 of the connector member 10 so there is no clearance 52, and no water spouts from the holes 39.

It can be appreciated that because every open end portion 16 of the connector member 10 is same with one another, the clamping socket 26 and the nozzle 28 can De optionally attached to anyone of such three open end portions 16. Moreover, the nozzle 28 may function as a shut-off for the flow when it is in the lowest position, i.e., no clearance 52 thereof. Therefore, it can be easy to arrange the whole sprinkler system in the field through only using these three parts, i.e., the three-way connector member 10, the clamping socket 26, the nozzle 28, and the pipe units therewith.

Additionally, the nozzle 28 can be easily adjusted for controlling the flow rate of the jet. Therefore, when the water pressure of the water source is not high, it may still be easy and feasible to have required watering at the final nozzle 28 which is located at the end of the pipe line of such sprinkler system and is farthest from the water source, i.e., the faucet, via minimizing the flow rate of the other previous nozzles 26.

It can be noted that the restraint flange 44 can designedly extend to a predetermined height from the dish section 38 so that the spraying water can be restrained in a specific region. As shown in FIG. 1, the restraint flange 44 may be cut away partially with a notch 45, and thus water can jet toward the farther positions through such cut notch 45 in the flange 44. Therefore, the irrigation area can be efficiently conformable to the layout of the plant field requiring watering.

Figure 3:
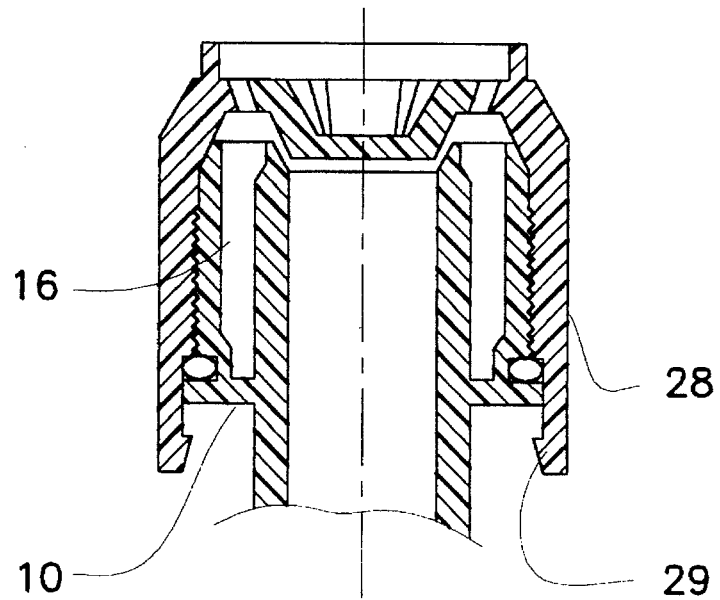
FIG. 3 is a partial cross-sectional view of another embodiment of the connector member with a hook-rim nozzle thereon.

Referring to FIG. 3, to prevent the nozzle 28 from being moved out of the corresponding opening end portion 16 of the connector member 10, the bottom edge of the nozzle 28 is provided with a hook portion 29 so that once installed, such nozzle 28 cannot be removed from the opening end portion 16 even though there is a "loose" state of the structure relation between the nozzle 28 and the open end portion 16, i.e., the nozzle 28 not reaching the lowest position with regard to the corresponding open end portion 16.

Figure 4:
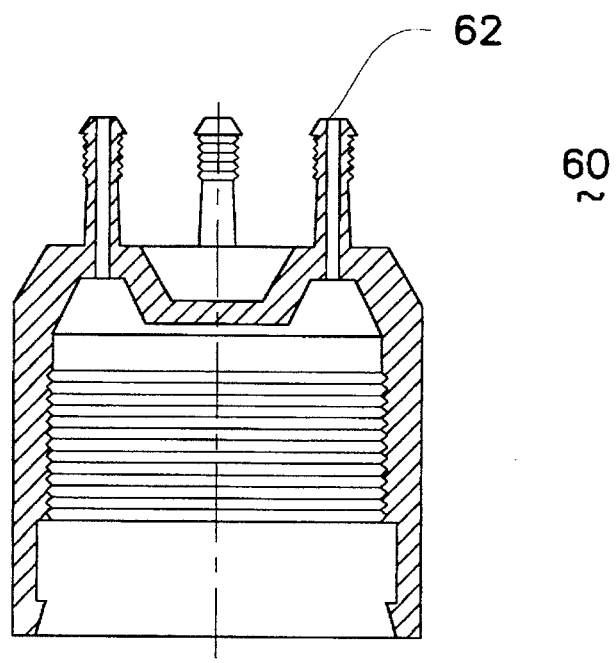
FIG. 4 is a cross-sectional view of a reducer for use with the connector member of FIG. 1.
Figure 5:
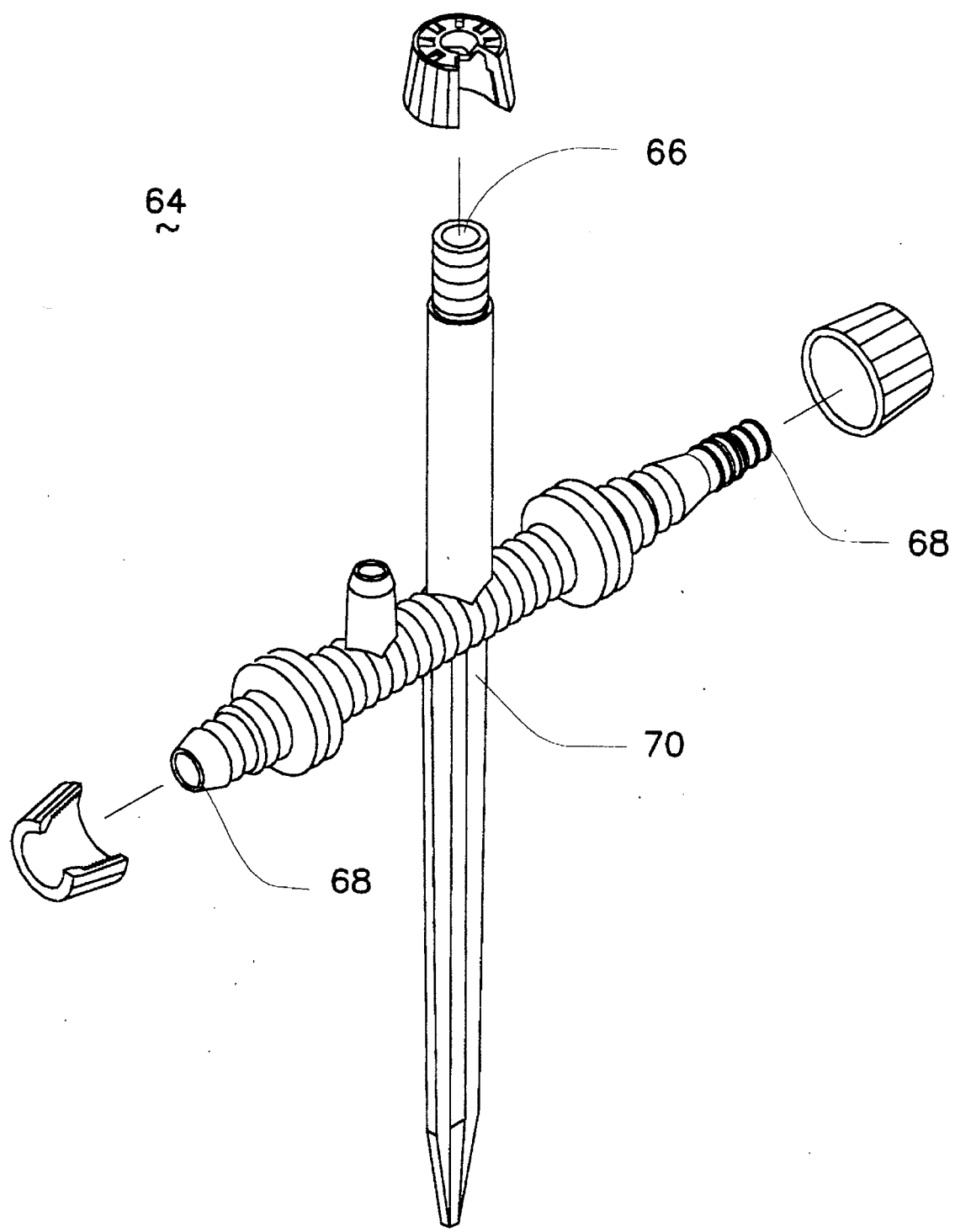
FIG. 5 is a perspective view of a dripper for use with the reducer of FIG. 4.

FIG. 4 shows an adaptor or reducer 60 for use with the sprinkler system in the present invention, which replaces the nozzle 28 for splitting the primary flow to several small rate flows through its smaller outlets 62. A dripper 64 as shown in FIG. 5 can be connected with such smaller outlet 62 through a flexible small size hose. Such dripper 64 is generally of a cross configuration having passage extending therethrough. Similar to the connector member 10, the top outlet 66 can be covered by a head for dripping, and the side outlet 68 can fasten the corresponding hose thereto, while the pin body 70 thereof is inserted into the soil in a flower-pot.

Figure 6:
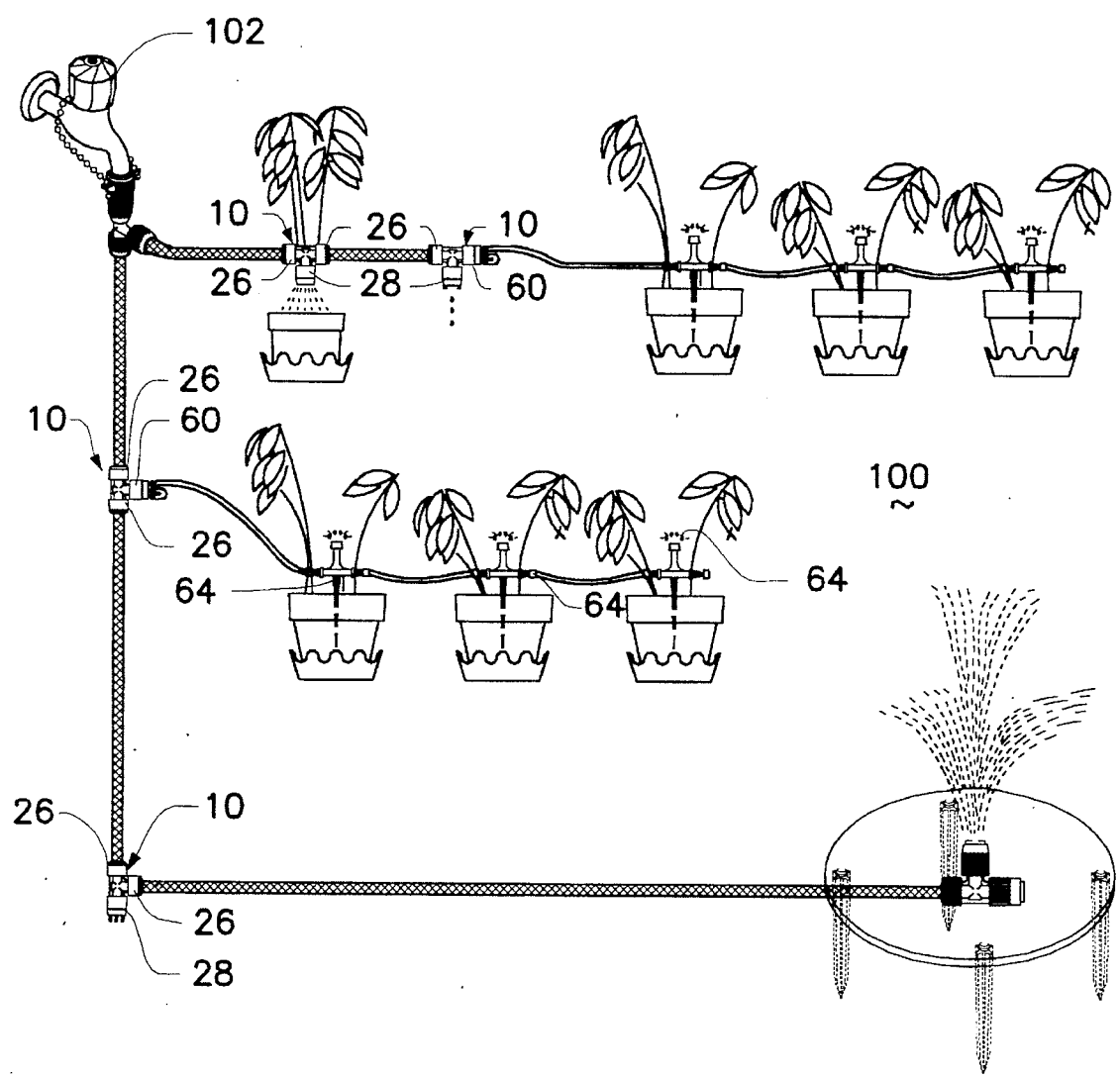
FIG. 6 is a schema tic diagram to show a sprinkler system using the connector members of FIG.1.

A sprinkler system 100 as Shown in FIG. 6 can be implemented by means of the subject connector member 10, and through the adjustment of the nozzles 28 of the connector members 10 along such system, the water dispersed around the distal end, i.e., the farthest position away from the source 102 of such sprinkler system may maintain the desired amount by minimizing the water jet in the previous nozzles 28.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claims.

Therefore, persons of ordinary skill in this field are to understand that all such equivalent structures are to be included within the scope of the following claims.

What is claimed is:

1. A connector member assembly for use with a sprinkler system, comprising:

a hollow body including a passage extending therein, and a plurality of identical open end portions;

each of said plurality of open end portions including an inner tubular section in communication with said passage, and an outer tubular section concentrically surrounding said inner tubular section;

said outer tubular section including means for providing radial deformability thereof, said outer tubular section further including fastening means for adaptably attaching one of different counterparts thereto wherein a first counterpart is a clamping socket attached to a first of said plurality of open portions, through which a pipe can be firmly sandwiched in a space defined between the inner tubular section and the outer tubular section; and wherein a second counterpart is attached to a second of said plurality of open end portions, and said second counterpart is a nozzle including a plurality of jetting holes vertically extending through a dispersal dish section so that water jet can be dispersed therefrom; and wherein said nozzle is of a tubular type having internal threads thereon for engagement with the outer tubular section, and includes a bowl-like section positioned substantially at a center portion of the dispersal dish section, whereby a circumferential wall of said bowl-like section defines a slope in compliance with a chamfer formed on an edge of the inner tubular section, and said space between the outer tubular section and the inner tubular section is generally aligned with a ring, region of the dish section where the jetting holes are position.

2. The connector member assembly as defined in claim 1, wherein said clamping socket is of a tubular type having internal threads provided thereon, and said outer tubular section of each of said plurality of open end portions includes a thread portion having external treads thereon and a flexible portion having a plurality of axial slits circumferentially positioned at intervals, whereby a slope portion of said clamping socket can press said flexible portion inwardly for sandwiching the pipe between the inner tubular section and the outer tubular section when the internal threads of the clamping socket are completely engaged with the external threads of the outer tubular section.

3. The connector member assembly as defined in claim 1, wherein said nozzle further includes a ring type restraint flange upwardly extending from a periphery of the dish section, and said restraint flange can have at least one notch thereof for arrangement of an irrigation area which is conformable to a shape of a grass field.

4. The connector member assembly as defined in claim 2, wherein a third counterpart can be applied to one of said plurality of open end portions, and said third counterpart is an adaptor for reducing a flow rate, said adaptor being of a tubular type having internal threads thereon for engagement with the external threads of the outer tubular section of the connector member, and a plurality of smaller outlets being adapted to be connected to drippers through corresponding smaller size hoses.

5. The connector member assembly as defined in claim 1, wherein said hollow body is generally of a "T" shape, and three open end portions are provided wherewith.

* * * * *